(No Model.)
C. H. DEXTER.
COMBINED STEAM AND HOT AIR COOKING APPARATUS.
No. 475,678. Patented May 24, 1892.
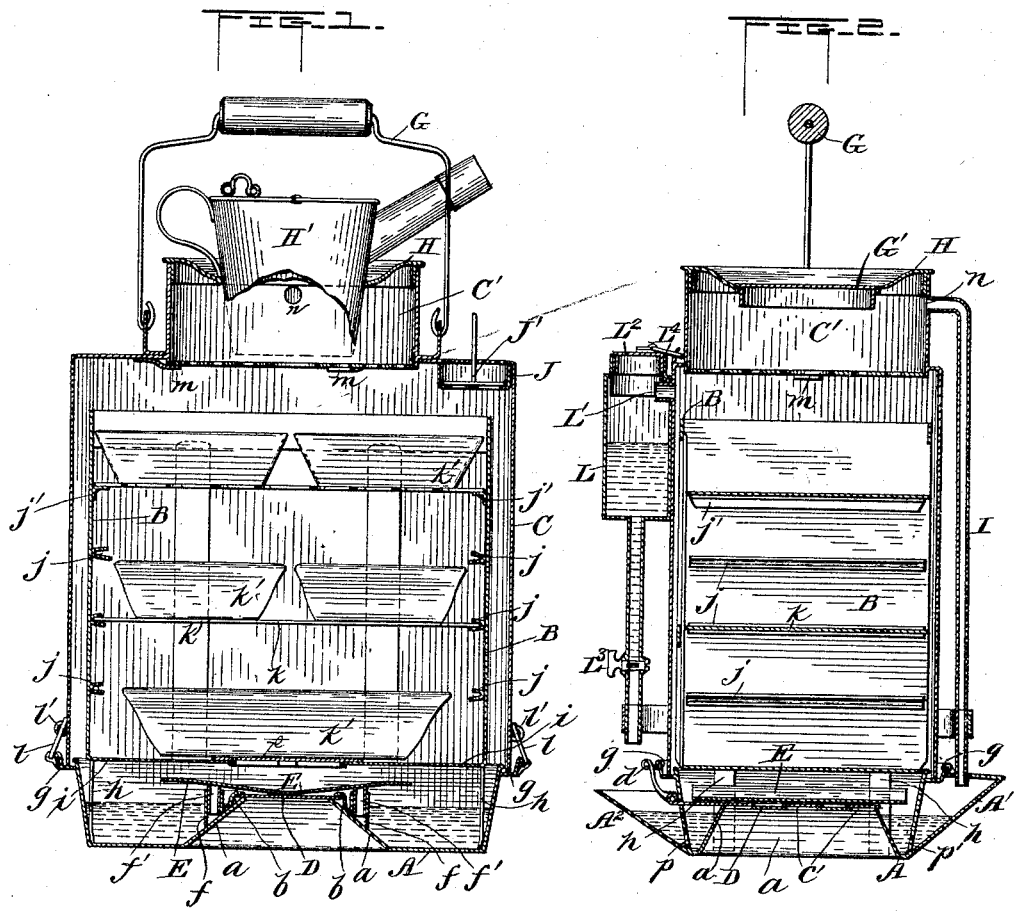
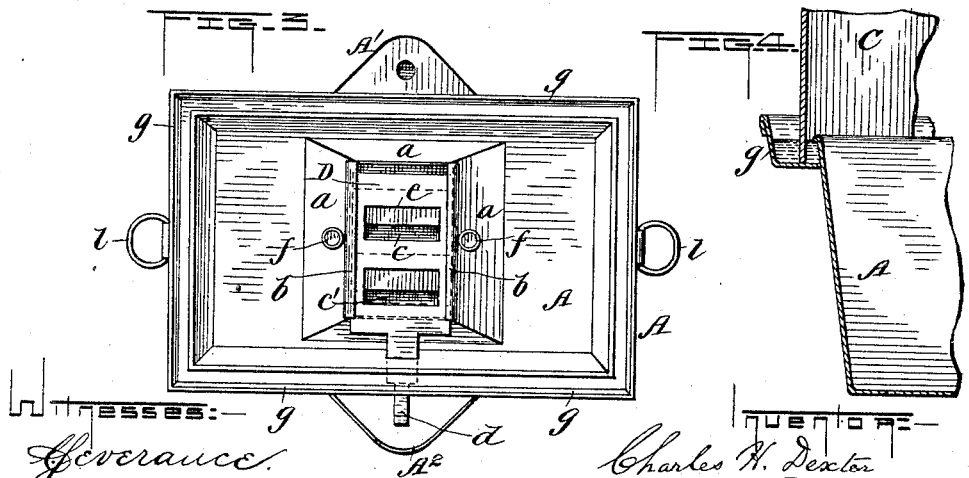

UNITED STATES PATENT OFFICE.

CHARLES H. DEXTER, OF ANNAPOLIS, MARYLAND.

COMBINED STEAM AND HOT-AIR COOKING APPARATUS.

SPECIFICATION forming part of Letters Patent No. 475,678, dated May 24, 1892.

Application filed September 2, 1891. Serial No. 404,536. (No model.)

*To all whom it may concern:*

Be it known that I, CHARLES H. DEXTER, a citizen of the United States, residing at Annapolis, in the county of Anne Arundel and State of Maryland, have invented certain new and useful Improvements in a Combined Steam and Hot-Air Cooking Apparatus; and I do hereby declare the following to be a full, clear, and exact description of the invention, such as will enable others skilled in the art to which it appertains to make and use the same.

My invention relates to portable combined steam and hot-air cooking apparatuses which are adapted for being used on the top of a stove, range, or other heater; and its object is to provide a simple, effective, and conveniently-manipulated contrivance with which food can be cooked either by the steaming, boiling, frying, or baking processes; and my invention consists, mainly, in a steam and hot-air cooking apparatus comprising a chambered and centrally-perforated steam-generating and hot-air-circulating base-section adapted for holding the water from which the steam is generated and for receiving the water of the condensed steam and forming by the condensed fluid a water-valve, a support having sliding perforated shelves or partitions on which articles to be cooked or cooking utensils containing such articles are placed, a vertically-movable casing provided with a water-holding chamber in which the surplus steam is condensed, and from which the water of condensation is resupplied to the boiler or generator, a relief-valve, and an exterior cooking chamber or vessel, the whole serving for cooking either by steam or hot air, or both hot air and steam combined, in an economical, safe, and satisfactory manner, and by reason of its exterior casing being adjustable upwardly independently of its base-section and of the shelved or partitioned support when it is desired to inspect the cooking operation or introduce or remove cooking utensils or articles which have been cooked or are to be cooked, and of again readily being readjusted to its closed position, affording great convenience to those using it.

My invention also consists in certain other novel constructions, combinations, and arrangements of parts, as will be hereinafter described, whereby the odors from the cooking-chamber can be conducted down into the steam-generating base-section, and the apparatus can be utilized for boiling coffee or steeping tea in a vessel supported within the top or exterior cooking-chamber.

In the accompanying drawings, Figure 1 is a vertical central section of my improved apparatus as adjusted for cooking by steam. Fig. 2 is a similar section taken at right angles to that of Fig. 1. Fig. 3 is a horizontal or plan view of the base-section with the flame-deflecting plate removed and with the valve or slide for allowing the circulation of flame and hot air open, this being the adjustment of the apparatus when the cooking operation is to be performed by hot air and flame alone or by steam and hot air combined. Fig. 4 is a broken detail vertical section showing a portion of the outer case and base-section.

A in the drawings designates the steam-generating and hot-air-circulating base-section, B the shelved or partioned support, and C the outer inclosing case. The section A may be of cast metal and in the form of a deep upwardly-flared oblong or rectangular pan. At the center of the bottom plate a pyramidal or conical-shaped elevation $a$ is constructed, the same extending up to about half the depth of the pan and terminating with a truncated slotted open end, as shown. This elevation is made hollow and open at its bottom, so that flame may circulate around and against its exterior surfaces, and thereby produce a large amount of heat for the generation of steam. On top of this elevation guiding-ledges $b$ are provided, and in these ledges a sliding damper or cut-off D with perforations $c$ in it is fitted to slide horizontally, and thereby open and close the slotted truncated end of the elevation and allow flame or hot air from a griddle-hole of a stove or range to pass directly up into the cooking-section of the apparatus. The slide is provided with a handle $d$, which extends through the base-section and can be manipulated on the outside of said section. Across the truncated end of the elevation $a$ spaced bridge portions $c'$ are provided, in order to form the slots, and also that when the damper is moved fully in the openings $c$ therein shall be closed by the bridge portions, and vice versa when the damper is moved fully out.

Above the damper D and the elevation $a$ an inverted approximately-pyramidal plate E is arranged, being removably connected to the elevation $a$ by means of tubular sockets $f$ of the elevation and vertical projections $f'$ of the plate E. This plate E can be lifted out of its position by withdrawing the projections $f'$ out of the sockets $f$. When this plate is in position, it serves for spreading and directing the steam or hot air toward the ends and sides of the base-section, and thus diffusing the heat more thoroughly or equably in the cooking apparatus, and when it is removed and the damper opened and a cover-plate $e$ removed from opening in plate $i$ the flame or hot air can pass directly in contact with vessels on the shelved or partitioned support, and thus fry or bake articles by direct action of the heat. At the upper edge, on the outside of the base-section a guttered, flange $g$ is provided for the reception of the water of condensation from the steam, this flange also serving as a support for the outer casing C, and by means of the water held by it, as a water-sealing valve between the lower edge of said casing and base-section, thereby preventing the escape of steam. The partitioned or shelved support B may be of cast or other metal, and it is formed, preferably, with two closed sides and two open ends; but it may be formed with four closed sides, one of which may be constructed as a hinged door to be opened and closed as occasion requires. This support is provided with legs $h$ and with a centrally-perforated bottom plate $i$, the opening in which is covered at will with the plate $e$ and with V-shaped shelf-supporting brackets $j$, in which the shelves or partitions $k$ are fitted to slide back and forth horizontally. It is also provided with upper angular brackets $j'$, upon which the top plate of the support B rests. The shelves or partitions may be perforated in any desirable manner to permit the steam or hot air, or both steam and hot air, to circulate and come in contact with the articles being cooked or with vessels, as $k'$, containing the articles to be cooked. The support B is of less width and length than the outer case C and occupies a position inside the outer case and base-section, with its legs resting on the horizontal bottom portion of the base A, as represented, thus leaving a space all around it for the free circulation of the steam and hot air. The support B is also of considerable less height than the case C, thus leaving a space above it for the circulation of the steam and hot air. The case C is placed around the support B, with its lower edge setting down snugly in the gutter-shaped water-channel formed by the flange $g$, and is held in this position by means of handle-loops $l$ of the base-section and lugs or catches $l'$ of the case, as shown. By throwing down the loops the case can be raised by its handle or bail G.

On top of the case C a cooking-chamber C' is constructed. This chamber is provided with a perforated bottom and with a removable top H, with a central opening through it for the admittance of a coffee-pot H', as illustrated in Fig. 1, said opening being provided with a closing-plate G', as shown in Fig. 2. The top of this chamber may be fitted so as to be made steam-tight in a water-valve gutter similar to that formed by the flange $g$, and in like manner the plate G' may be fitted steam-tight. The cooking-chamber C' has its bottom removable, in order that either a closed bottom or a perforated bottom may at will be used, and thus different styles of cooking carried on in said chamber. The removable bottom is supported in position by means of spaced lugs $m$. In the side of this chamber C' a passage $n$ is provided, and this passage connects with a pipe I, which leads down into the base-section A through a closed extension portion A' of the base-section, as shown. By means of the passage and pipe any disagreeable odors arising in the cooking-chamber are conducted into the base A and caused to mingle with the water in the generating-chamber. At one corner of the case C and beneath perforations in the top of said case a safety-valve chamber J, with perforations in its bottom, is provided, and in this chamber a rising and falling valve J' is arranged, so as to open and close the perforations of said chamber as circumstances demand.

On the outside of the casing C a portable condensing-chamber L is applied, and this chamber communicates with the interior of the cooking apparatus by means of a passage L'. This chamber is provided with a cap $L^2$ and with a conducting pipe and cock, as $L^3$, said pipe overhanging and discharging into an open extension $A^2$ of the base-section A, which extension, as well as the extension A', is allowed communication with the steam-generating chamber by means of passages $p$ $p'$, as shown. The condensing-chamber is held in position by means of a collar around the passage L and a loop and catch, as $L^4$. This chamber is usually filled at the start to about one-half its height with water, and by means of the water therein any surplus pressure of steam in the cooking apparatus will be condensed. At intervals the cock at $L^3$ is opened and the water from the condensing-chamber allowed to flow into the extension of the base-section and therefrom into the steam-generating chamber thereof, and thus the water is used over again.

In the operation of the apparatus any steam that condenses on the inner surface of the walls of case C will run down into the gutter formed by the flange $g$ and thus form the water-valve, and in the event of two much water condensing into this guttered flange the same will overflow into the base-section A, as its edge is lower than the outer edge of the flange.

With my invention much of the inconvenience experienced with cooking apparatuses which require the shelf-support and the articles which are cooked to be lifted out through the top of the case is avoided, as by simply lifting the case C the cooking can be inspected and either one of the shelves between the top and bottom plates can be drawn out and manipulated, as may be necessary. My apparatus is also more agreeable on account of its conducting the odors into the generating-chamber. It is also economical and safe on account of capability of condensing the steam into water for reuse and its providing against explosion, and also on account of its conducting the vapors, which settle on the inside of the walls, into the guttered flange and forming thereby a water-valve, and also on account of conducting any overflow back into the generator. It is also very desirable, as it admits of either steam or hot air, or both steam and hot air, being used. If two or more of the griddle-holes of a stove or range or two more burners are used for supplying heat or flame, the apparatus will be set over the same in such a manner that a portion of each of the burners will supply the flame against the outer surface of the pyramidal elevation of the base-section A.

What I claim as my invention is—

1. In a combined steam and hot-air cooker, the combination of the steam-generating base-section A, provided with a gutter-shaped flange for forming a water-valve and with a downwardly-flared hollow open-ended elevation $a$, against the interior of which the flame strikes, an open-work damper applied on the top of the elevation, a shelf-support B of less width, length, and height than the outer case and resting upon the base-section, and an outer inclosing case C, arranged to slide up and down and have its lower edge inserted into the gutter of the flange and sealed with water, substantially as described.

2. The combination, with the steam-generating base-section A, having a gutter-shaped flange and a downwardly-flared hollow open-ended elevation $a$, against the interior of which the flame strikes, the open-work hot-air damper, and the upwardly-flared movable plate E, the shelf-support, and the outer inclosing case, substantially as described.

3. The combination of the outer case, shelved support, steam-generating section, and the external cooking-chamber C', having a removable bottom, a removable centrally-perforated cover portion H, and a closing-cover G', substantially as and for the purpose described.

4. The combination of the pipe I, chamber C', outer case, shelf-support, steam-generating base-section having extension A', gutter-shaped flange and hollow open-ended and downwardly-flared elevation $a$, against the interior of which the flame strikes, open-work damper, and removable upwardly-flared plate, substantially as described.

5. The combination of the condensing-chamber L, having pipe and cock, as $L^3$, and cap, as $L^2$, outer inclosing case, shelf-support and steam-generating base-section having extension $A^2$, passage $p$, and hollow open-ended and downwardly-flared elevation $a$, and open-work damper D, substantially as described.

6. The combined steam and hot-air cooker, comprising, in combination, the steam-generating base-section A, having gutter-shaped flange, extensions A' $A^2$, passages $p$ $p'$ and hollow open-ended and downwardly-flared elevation $a$, open-work damper D, upwardly-flared removable plate E, shelf-support B, having V-shaped shelf-brackets, vertically-sliding outer case C, condensing-chamber L, having pipe, cock, and cap, the odor-return pipe I, chamber C', and safety-valve J J', substantially as described.

In testimony whereof I hereunto affix my signature in presence of two witnesses.

CHARLES H. DEXTER.

Witnesses:
  THOS. I. TAYLOR,
  ARTHUR MARTIN.